United States Patent
Kanatake et al.

(10) Patent No.: US 8,125,869 B2
(45) Date of Patent: Feb. 28, 2012

(54) OPTICAL RECORDING METHOD AND OPTICAL RECORDING DEVICE

(75) Inventors: Yusuke Kanatake, Tokyo (JP); Tomo Kishigami, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 489 days.

(21) Appl. No.: 12/153,965

(22) Filed: May 28, 2008

(65) Prior Publication Data

US 2008/0298195 A1    Dec. 4, 2008

(30) Foreign Application Priority Data

May 29, 2007   (JP) ................. 2007-141594

(51) Int. Cl.
*G11B 7/00*    (2006.01)
(52) U.S. Cl. .................. 369/53.36; 369/53.35
(58) Field of Classification Search ............... 369/53.36
See application file for complete search history.

(56) References Cited

U.S. PATENT DOCUMENTS

| | | | |
|---|---|---|---|
| 6,975,571 B1 | 12/2005 | Narumi et al. | |
| 7,751,290 B2 * | 7/2010 | Kuijper et al. | 369/53.2 |
| 2004/0160874 A1 | 8/2004 | Hwang et al. | |
| 2005/0073929 A1 * | 4/2005 | Mutou | 369/53.35 |
| 2005/0174906 A1 * | 8/2005 | Narumi et al. | 369/47.53 |
| 2005/0254359 A1 * | 11/2005 | Yak et al. | 369/44.23 |
| 2005/0265183 A1 * | 12/2005 | Kakimoto et al. | 369/47.53 |
| 2006/0007828 A1 * | 1/2006 | Kadowaki et al. | 369/53.12 |
| 2007/0165506 A1 | 7/2007 | Nakamura et al. | |
| 2009/0073846 A1 | 3/2009 | Tsukahara et al. | |

FOREIGN PATENT DOCUMENTS

| | | |
|---|---|---|
| JP | 2002-25060 A | 1/2002 |
| JP | 2002-312938 A | 10/2002 |
| JP | 2004-152473 A | 5/2004 |
| JP | 2006-114103 A | 4/2006 |
| JP | 2006-302332 A | 11/2006 |
| JP | 2007-48412 A | 2/2007 |
| JP | 2007-200389 A | 8/2007 |
| JP | 2007-200435 A | 8/2007 |
| JP | 2007-294047 A | 11/2007 |
| WO | WO 00/57408 A1 | 9/2000 |
| WO | WO 2005/066940 A1 | 7/2005 |
| WO | WO 2006/117913 A1 | 11/2006 |

OTHER PUBLICATIONS

"Physical Format of the Blu-ray Disc.", Sharp Technical Journal No. 90, Dec. 2004: pp. 11-15.

* cited by examiner

*Primary Examiner* — Lixi C Simpson
(74) *Attorney, Agent, or Firm* — Birch Stewart Kolasch & Birch, LLP

(57) ABSTRACT

To adjust the parameters of a write strategy for recording data on an optical recording medium, the jitter value of a reproduced signal obtained from recorded data is detected. If the jitter value exceeds a prescribed threshold, a write strategy parameter having a comparatively small effect on the jitter value is adjusted, and subsequent data are written on the recording medium using the adjusted parameter. Parameters are selected for adjustment in ascending order of their effect on the jitter value. Stable data recording can thereby be carried out without significant jitter degradation.

22 Claims, 9 Drawing Sheets

FIG.8(a)
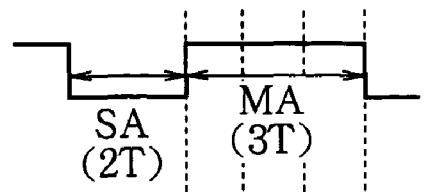
FIG.8(b)
FIG.8(c)
FIG.8(d)
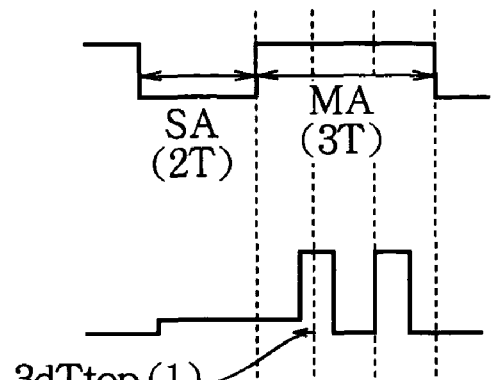
FIG.8(e)
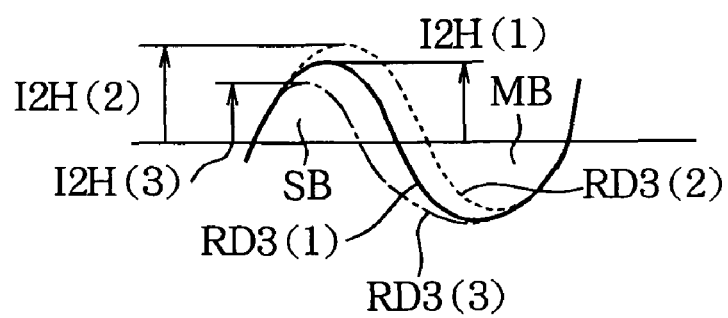

OPTICAL RECORDING METHOD AND OPTICAL RECORDING DEVICE

BACKGROUND OF THE INVENTION

1. Field of the Invention

The present invention relates to an optical recording method and an optical recording device for recording data on an optical disc, more particularly to a method of adjusting a write strategy used in recording.

2. Description of the Related Art

In recent years, Blu-ray discs and other large-capacity next-generation optical discs are being used in increasingly many optical recording devices. For stable recording on these types of optical discs, the recording pulse parameters, that is, the write strategy parameters, that are considered optimal for the characteristics of each optical disc are recorded on the optical disc, in the optical recording device, or elsewhere, and optimal settings are made for each disc.

However, when data are recorded on an optical disc, the use of write strategy parameters set for each optical disc as above does not always permit stable recording to be carried out, because of environmental changes such as changes in ambient temperature, and changes in the recording region on the optical disc, that is, the radial position on the optical disc.

As a solution to this problem, Japanese Patent Application Publication No. 2002-312938 (pp. 1-7, FIGS. 1-12) for example, proposes detecting the lengths of pits and lands that are formed by recording data on an optical disc, modifying the write strategy parameters according to the results, and recording data again. In another proposal, made in Japanese Patent Application Publication No. 2006-302332 (pp. 1-23, FIGS. 1-16), for example, data are recorded on an optical disc and the amount of edge shift of each recording pattern is used as an index to adjust, in particular, the write strategy parameters related to the shape of the shortest recording mark. Multi-pulse write strategies for Blu-ray discs and the like are also disclosed in *Sharp Technical Journal* No. 90, December 2004 (pp. 11-15).

A problem with the technology disclosed by Japanese Patent Application Publication No. 2002-312938 is that it has not been possible to determine which write strategy parameter to modify, because pit lengths and land lengths are influenced by a plurality of parameters in the write strategy.

A problem with the technology disclosed by Japanese Patent Application Publication No. 2006-302332 is that since it adjusts the write strategy parameters related to the shortest recording mark shape, which have a large effect on the jitter value, if it adjusts these write strategy parameters in the wrong direction, because of the high sensitivity of the jitter value, the jitter value degrades substantially, leading to fatal recording degradation and unstable recording.

The present invention addresses the above problems with the object of enabling stable recording at all times without substantial jitter degradation.

SUMMARY OF THE INVENTION

The inventive optical recording method records data by directing laser light onto an optical recording medium according to parameters of a write strategy based on a length of the data. The method comprises:

detecting, at the time of recording, a jitter value of a signal reproduced from recorded data and deciding whether the jitter value exceeds a prescribed threshold value;

adjusting, at the time of recording, a parameter when the jitter value exceeds the prescribed threshold value, the adjusted parameter being one of the parameters of the write strategy having a relatively small effect on the jitter value; and performing recording again, using the adjusted parameter.

According to the present invention, if the jitter value when data are recorded exceeds an arbitrarily settable threshold value, a write strategy parameter with a small effect on the jitter value is adjusted, so that even if the wrong parameter adjustment direction is selected, data recording can always remain stable without substantial jitter degradation.

BRIEF DESCRIPTION OF THE DRAWINGS

In the attached drawings:

FIGS. 8(a) to 8(e) show the space level of a 2T space followed by a 3T mark in the reproduced signal detected by the space level detector in the second embodiment;

DETAILED DESCRIPTION OF THE INVENTION

First Embodiment

A first embodiment of the invention will be described below with reference to the drawings.

The optical recording method in the embodiments described below performs mark-edge recording (PWM recording). To record information, it causes a semiconductor laser to emit multiple pulses or non-multiple pulses according to a write strategy (a laser emission waveform rule used in recording) to form recording marks, based on the data to be recorded on the optical disc. In the multiple-pulse or nonmultiple-pulse-type write strategy in the embodiments that will be described below, parameters related to the pulse width, the shift in the starting position of the leading pulse, and the shift in the starting position of the erasing pulse in the write strategy are adjusted on the basis of the jitter value of a reproduced signal obtained from data recorded on the optical disc.

In addition, in the embodiments described below, the lengths of marks and lengths of spaces between the marks are the lengths of signal portions corresponding to the marks and spaces, expressed in units of the period T of the channel clock used in recording and reproducing, and the recording of data onto the optical disc is carried out by illuminating the optical disc with optical pulses in 1-7PP modulation patterns with 2T to 9T marks, that is, mark lengths of n clock periods, where n is 2 to 9. This modulation system is used on, for example, Blu-ray discs.

Figure 1:
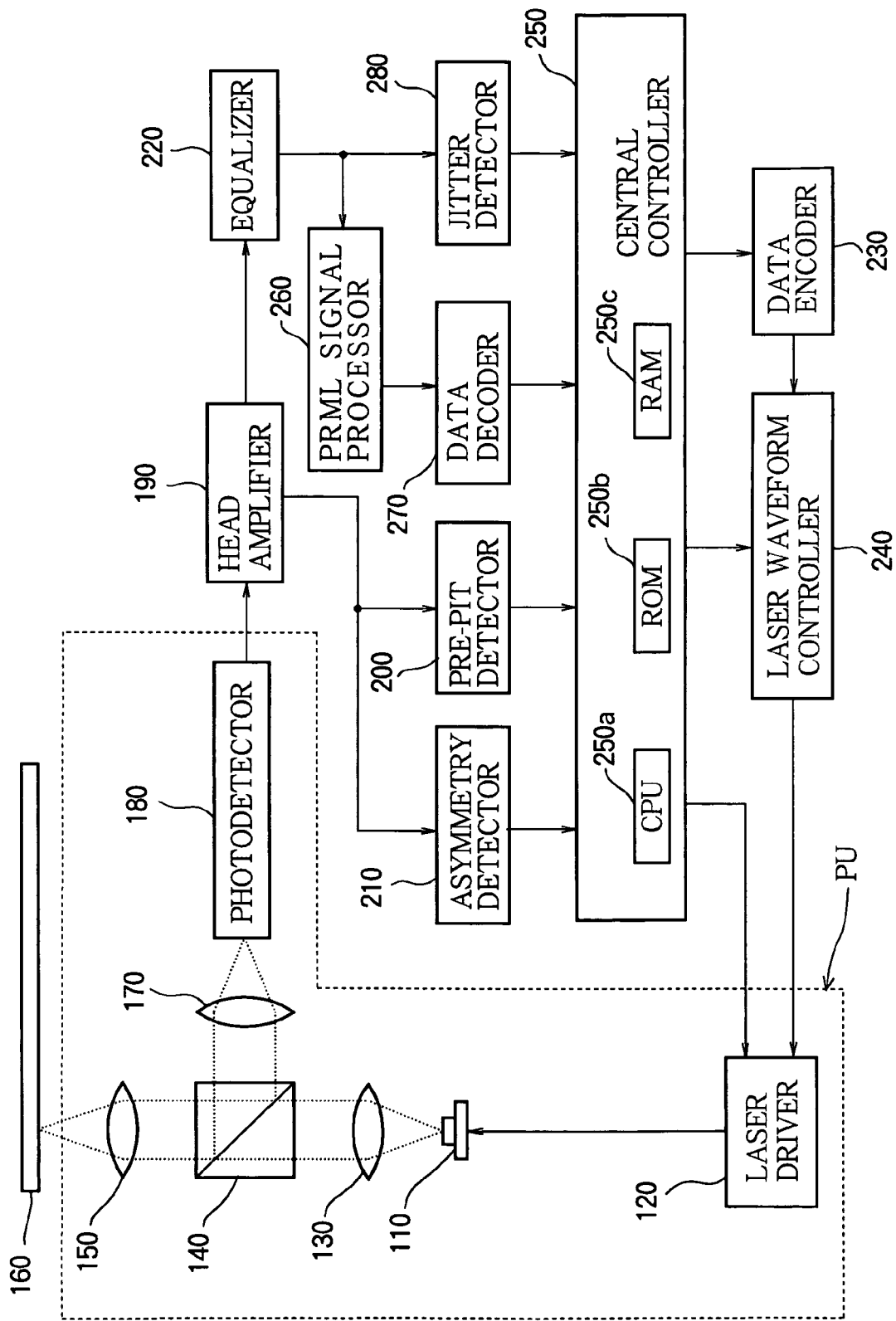
FIG. 1 shows an exemplary structure of the optical recording and reproducing device in a first embodiment of the invention.

The drawings referred to in the first embodiment will now be described. FIG. 1 is a drawing showing an example of the basic structure of the optical recording and reproducing apparatus. FIGS. 2(a) to 2(e), which are drawn from *Sharp Technical Journal* No. 90, December 2004 (pp. 11-15), illustrate an exemplary write strategy generated in the optical recording and reproducing device in recording on an optical disc.

Figure 3:
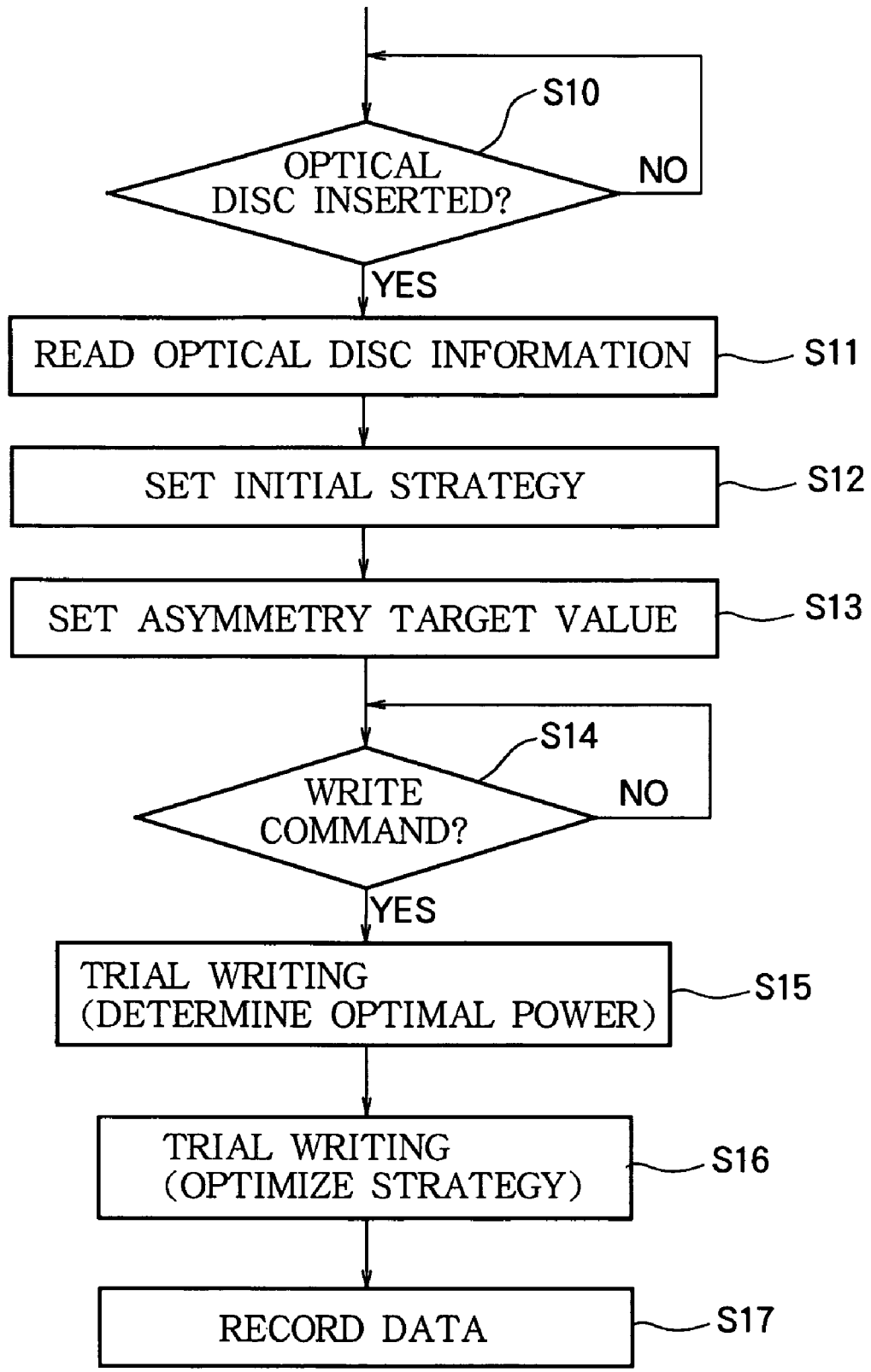
FIG. 3 is a flowchart illustrating an exemplary procedure from insertion of an optical disc to recording in the optical recording and reproducing methods in the first and second embodiments of the invention.
Figure 4:
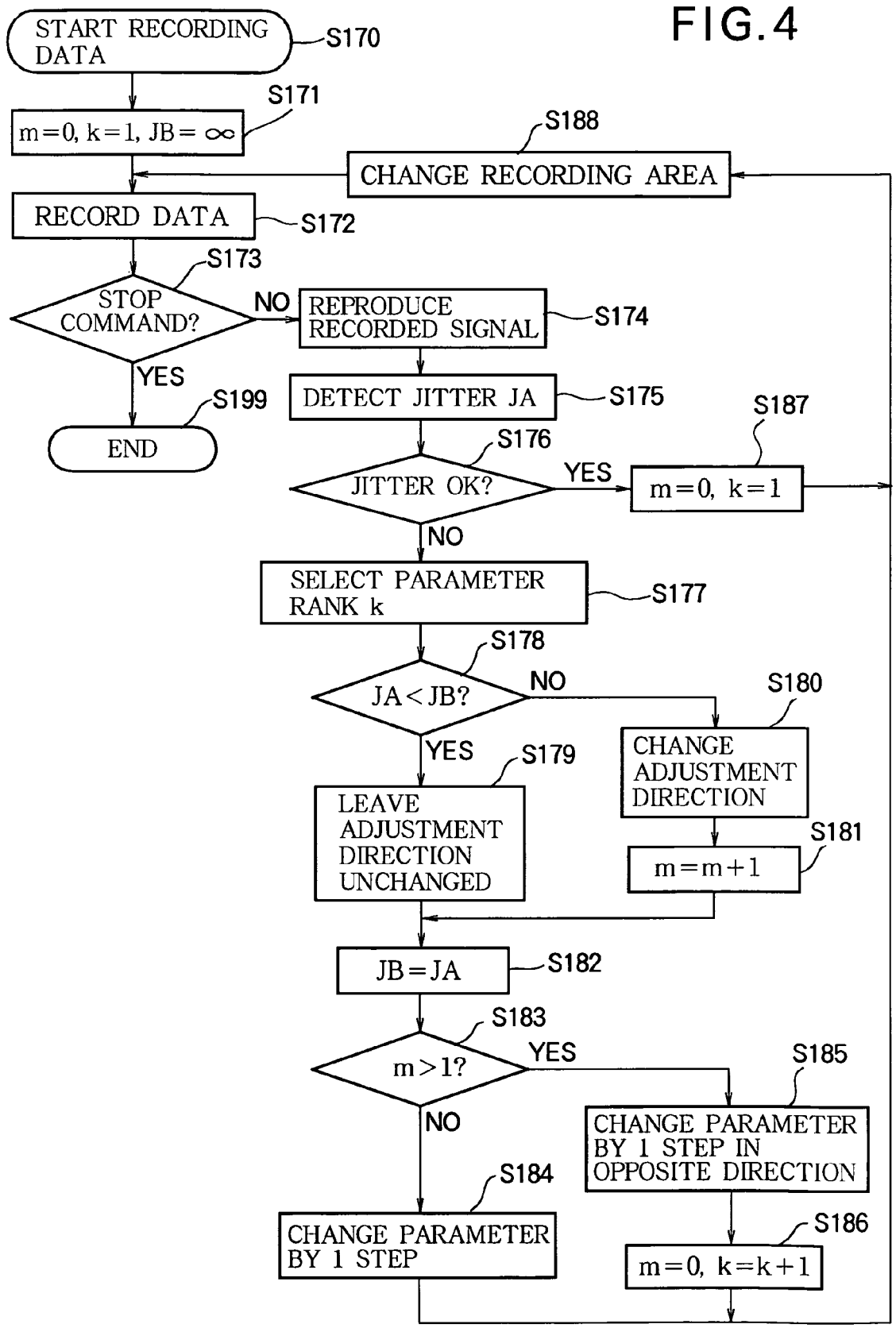
FIG. 4 is a flowchart illustrating an exemplary data recording procedure in the optical recording and reproducing method in the first embodiment.
Figure 5:
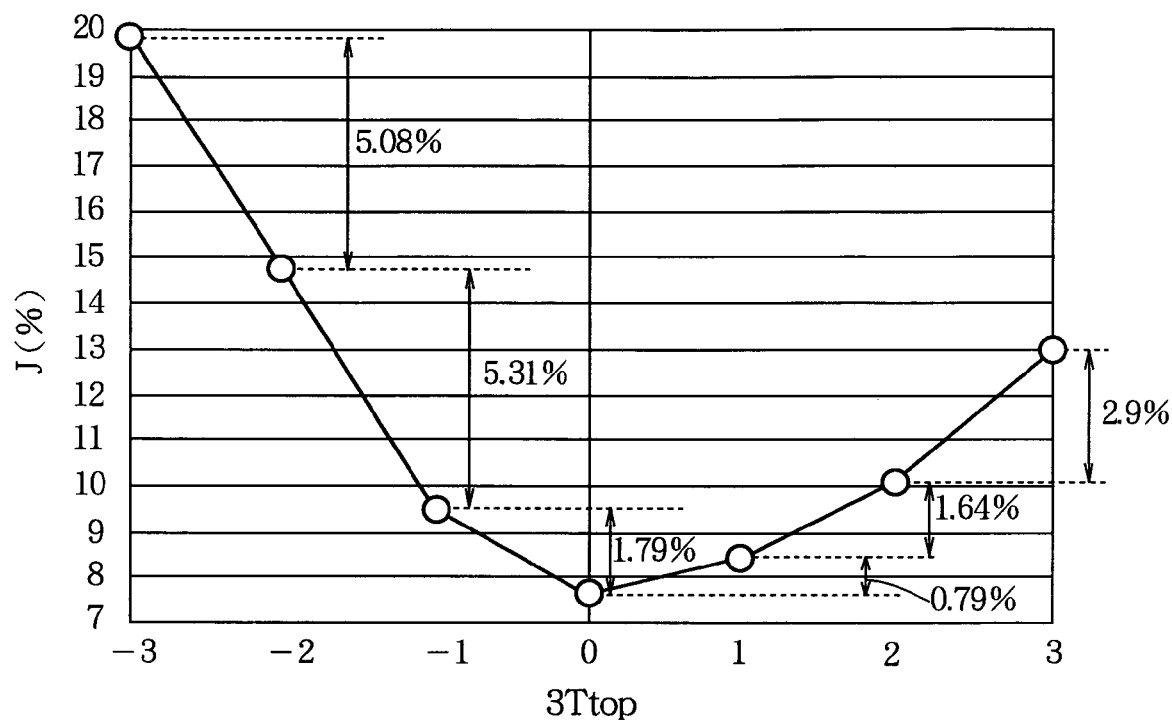
FIG. 5 is a graph illustrating the change in the jitter value detected by the jitter detector in the first embodiment per step of a write strategy parameter.

FIG. 3 is a flowchart illustrating an exemplary procedure from insertion of an optical disc to recording in the optical recording and reproducing method. FIG. 4 is a flowchart illustrating an exemplary data recording procedure in the optical recording and reproducing method. FIG. 5 is a graph illustrating the change in the jitter value J detected by the jitter detector per step (minimum increment) of a write strategy parameter.

In FIG. 1, the semiconductor laser 110 used as a laser light source is driven and controlled by a laser driver 120.

When data are reproduced, a laser beam emitted from the semiconductor laser 110 and having the output value (reproducing power) necessary for data reproduction is focused onto the optical disc 160 through a collimator lens 130, beam splitter 140, and objective lens 150. The light reflected from the optical disc 160 passes through the objective lens 150, is separated from the incident light by the beam splitter 140, and is then received through a sensor lens 170 by a photodetector 180.

Of the above, the semiconductor laser 110, collimator lens 130, beam splitter 140, objective lens 150, and sensor lens 170 constitute the optical system, which in turn, together with the photodetector 180 and the laser driver 120, constitutes the optical pickup PU.

The photodetector 180 converts the optical signal to an electrical signal. The electrical signal converted by the photodetector 180 is input through a head amplifier 190 into a pre-pit detector 200, an asymmetry detector 210, and an equalizer 220. From the input electrical signal, the pre-pit detector 200 detects prerecorded pre-pit information specific to the optical disc 160, such as a recommended asymmetry value α.

The electrical signal input from the head amplifier 190 to the equalizer 220 is reshaped, the error rate of the input signal is reduced by a PRML (Partial Response Maximum Likelihood) signal processor 260 that performs waveform equalization and maximum likelihood decoding, and then the signal is input to a data decoder 270. The signal reshaped in the equalizer 220 is also input to a jitter detector 280. The data decoder 270 binarizes the input electrical signal and generates (reproduces) the data recorded on the optical disc 160 by performing such processes as demodulation and error correction.

The jitter detector 280 detects a jitter value, an indicator obtained from the absolute value of the phase difference between the reproduced signal and a clock signal generated by a PLL (Phase Locked Loop, not shown).

The asymmetry detector 210 couples the input electrical signal by AC (alternating current) coupling and detects the peak level A1 and bottom level A2 of the AC-coupled electrical signal. Using the equation (1) below, it calculates an asymmetry value α from the detected peak level A1 and bottom level A2.

$$\alpha = (A1+A2)/2(A1-A2) \tag{1}$$

The peak level A1 and bottom level A2 occur in places where spaces of maximum length alternate with marks of maximum length; these values are expressed with a zero level equal to the average value of the peak level and bottom level in places where spaces of minimum length and marks of minimum length appear alternately.

In the recording of data, a data encoder 230 adds error correction symbols to the original data to be recorded that are received from a central controller 250 and modulates the data to generate the recording data on which the driving signal to the semiconductor laser 110 is based. A laser waveform controller 240 generates a write strategy signal based on the recording data. That is, after the write strategy is set by the central controller 250, when the data encoder 230 provides recording data specifying a number of periods n, more specifically, recording data specifying one of 2T to 9T, the laser waveform controller 240 outputs a write strategy signal corresponding to the provided recording data (a signal having a waveform approximately matching the waveform of the emitted optical pulse train).

The laser driver 120 drives the semiconductor laser 110 with driving current responsive to the write strategy signal thus generated. A laser beam emitted from the semiconductor laser 110 with the output value (recording power) necessary for recording the data is focused onto the optical disc 160 through the collimator lens 130, beam splitter 140, and objective lens 150. This forms marks and thus recorded segments comprising marks with spaces between them.

FIGS. 2(a) to 2(e) show an example of a write strategy signal generated in the laser waveform controller 240 in the optical recording and reproducing device 100. FIG. 2(a) shows a channel clock having a period T used for recording (a recording channel clock). FIG. 2(b) shows exemplary recording data comprising marks MA and spaces SA. FIG. 2(c) shows a write strategy signal, i.e., the emitted optical pulse pattern, for recording the data in FIG. 2(b). The emitted optical pulse pattern is a pulse-modulated recording pulse waveform having three power levels: a recording power level PW, an erasing power level PE, and a bias power level PBW. The width of the leading pulse F is defined as Ttop; the shift in the starting position of the leading pulse from the position shifted 1T to the right of the rising edge of a mark MA in the recording data shown in FIG. 2(b) is defined as dTtop; the width of an intermediate pulse M is defined as TMP; the shift in the starting position of an erasing pulse from the falling edge of a mark MA in the recording data shown in FIG. 2(b) is defined as dTE.

An intermediate pulse M is present when the number of clock periods n is 3 or greater, that is, the recorded mark length is 3T or greater; when n is 3 or greater, the number of intermediate pulses M is n−2.

FIG. 2(d) shows marks MK, and spaces SP positioned between the marks MK, generated on the optical disc by recording with the write strategy in FIG. 2(c). The horizontal axis in FIG. 2(d) indicates length (position) along the tracks on the optical disc, but for convenience, this axis is shown here as corresponding to the emitted optical pulse pattern in FIG. 2(c).

FIG. 2(e) shows a reproduced signal obtained by reading the marks MK and the spaces SP in FIG. 2(d). This reproduced signal has portions MB corresponding to the marks MK and portions SB corresponding to the spaces SP.

The shortest mark has a length of n=2 periods, corresponding to 2T, while the longest mark has a length of n=9 periods, corresponding to 9T.

FIGS. 2(b) and 2(c) show a case in which the shortest mark, namely the 2T mark, is recorded, next the second-shortest mark, namely the 3T mark, is recorded, and then the third-shortest mark, namely the 4T mark, is recorded.

During reproducing and writing operations by the optical recording and reproducing device 100, the central controller 250 in FIG. 1 controls the device as a whole. The central controller 250 receives pre-pit information from the pre-pit detector 200, an asymmetry value from the asymmetry detector 210, reproduced data from the data decoder 270, and a jitter value from the jitter detector 280, and provides control signals to the data encoder 230, the laser waveform controller 240, and the laser driver 120.

In addition, the central controller 250 calculates an asymmetry value as described later with reference to FIG. 3, and controls trial writing performed by use of an asymmetry value and a recording power level PW that are adjusted according to the calculated asymmetry value. While recording data on the optical disc 160, on the basis of the jitter value, the central controller 250 adjusts parameters having a small effect on the jitter value, among the write strategy parameters related to pulse width, the shift in the starting position of the leading pulse, and the shift in the starting position of the erasing pulse.

The central controller 250 comprises, for example, a CPU 250a, a ROM 250b storing programs for the operation of the CPU 250a, and a RAM 250c for storing data. The ROM 250b stores various data described later, such as a jitter tolerance in the adjustment of the write strategy parameters, described later, and a ranking of the effects of the write strategy parameters on the jitter value, also described later.

The recording power and strategy are generally optimized by performing trial writing before recording information. The procedure will be described below.

First, trial writing on the optical disc 160 is performed by use of a test pattern comprising 2T-9T marks and spaces corresponding to random recording data, for example, under varied recording power; next, the area on the optical disc 160 on which this test pattern has been recorded is reproduced, the asymmetry value is detected by the asymmetry detector 210, and the detected asymmetry value is compared with a target asymmetry value in the central controller 250 to obtain the optimal recording power.

In general, the higher the recording power is, the higher the asymmetry value becomes, and the lower the recording power is, the lower the asymmetry value becomes.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disc 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

After the trial writing on the optical disc 160 has been performed and the optimal recording power has been set, and the strategy has been similarly optimized by the trial writing, data are recorded in the data area of the optical disc 160. In this embodiment, as data are recorded, a signal is reproduced from the area in which the data are recorded, whether the obtained jitter value is in the tolerance of the jitter value prestored in the ROM 250b is determined, if the obtained jitter value is within tolerance recording is continued, and if the jitter value is not within tolerance, based on the effects on the jitter value of the write strategy parameters, which are likewise prestored in the ROM 250b, write strategy parameters with small effects on the jitter value are adjusted with priority. The adjustment of a write strategy parameter is performed one step (minimum increment) at a time on the basis of the jitter value.

The above-described effect on the jitter value refers to the amount of change in the jitter value when the parameter is adjusted by one step. Adjusting the parameter by one step means, for example, making a minimum unit variation in the laser waveform controller 240. The amount of change in the jitter value may be the average amount over a given range of parameter variation, or may be the maximum amount in the given range of parameter variation. It is assumed that these amounts of change are known beforehand.

The procedure followed in the optical recording method of this embodiment will now be described with reference to FIG. 3.

First, when the optical disc 160 to be used in recording is inserted in the optical recording and reproducing device 100, a sensor (not shown) detects this (step S10) and notifies the central controller 250, and the central controller 250 drives the optical pickup PU, thereby reading from the optical disc 160 the disc-specific information prerecorded by the disc manufacturer, such as recommended write strategy values and the recommended asymmetry value α (step S11).

Next, in step S12, the recommended write strategy values read from the optical disc 160 are set in the central controller 250 (in the RAM 250c, for example) as an initial write strategy. It is possible to use a specific write strategy preset in the optical recording and reproducing device 100, instead of values read from the optical disc 160, as the initial write strategy. Alternatively, it is possible to use a write strategy determined by values read from the optical disc 160 and a relational expression preset in the optical recording and reproducing device 100 as the initial write strategy.

Next, in step S13, the recommended asymmetry value α read from the optical disc 160 is set in the central controller 250 (in the RAM 250c, for example) as the target value to be used for optimizing the recording power. It is possible to use a specific value preset in the optical recording and reproducing device 100, instead of a value read from the optical disc 160, as the target asymmetry value α. Alternatively, it is possible to use a value determined from a value read from the optical disc 160 and a relational expression preset in the optical recording and reproducing device 100 as the target asymmetry value α.

Then, when a record command is given by a means not shown in the drawings (S14), in step S15, trial writing on the optical disc 160 is performed by use of the initial write strategy and target asymmetry value set as described above. That is, the write strategy (the strategy for each nT) set in the central controller 250 in step S12 is set in the laser waveform controller 240, a write strategy based on a test pattern is thereby generated in the laser waveform controller 240, and trial writing on the optical disc 160 is performed using the optical pickup PU. Then the area on the optical disc 160 on which the test pattern has been recorded is reproduced using the optical pickup PU, the asymmetry value detected by the asymmetry detector 210 is compared with the target asymmetry value set in step S13 in the central controller 250, and control is performed to make the two values match, whereby the optimal recording power is determined.

After this trial writing has been performed and the power has been adjusted, in step S16, similar trial writing is performed and the strategy is optimized. The optimization of the strategy may be performed in any way, or the initial strategy that has been set in step S12 may be used as the optimal values instead of performing an optimization of the strategy.

Next, data are recorded in the data area in step S17.

Of the above processes, the process in step S10 is performed by the central controller 250 and a sensor (not shown) for detecting the insertion of an optical disc; the process in step S11 is performed by the optical pickup PU, the head amplifier 190, the pre-pit detector 200, the equalizer 220, the PRML signal processor 260, the data decoder 270, and the central controller 250; the processes in steps S12 and S13 are performed by the central controller 250; the process in step S14 is performed by the central controller 250 and a section (interface) for receiving record commands (not shown); the process in steps S15 and S16 are performed by the head amplifier 190, the asymmetry detector 210, the central controller 250, the laser waveform controller 240, and the optical pickup PU; the process in step S17 is performed by the central controller 250, the data encoder 230, the laser waveform controller 240, and the optical pickup PU.

FIG. 4 shows the process performed in step S17 in FIG. 3 in more detail.

When data recording starts (step S170), initial settings are performed in step S171 to start recording onto the optical disc 160. In these initial settings, m is set to 0, k is set to 1, and JB is set to an unlimitedly large value (i.e., the maximum expressible positive value), where m is a numeric value that is increased in increments of one in step S181, described later, to indicate the number of times the jitter value obtained by reproducing the recorded signal is out of tolerance and is worse than the jitter value obtained the immediately preceding time, and k indicates a rank assigned to each of the write strategy parameters in ascending order of their effect on the jitter value.

The process in step S171 is performed by the central controller 250.

Next, in step S172, recording onto the optical disc 160 is performed by use of the recording power determined in step S15 and the write strategy optimized in step S16. This recording process pauses when a buffer (not shown) provided in the optical recording and reproducing device 100 for temporally storing write data becomes empty, and resumes when the recorded signal has been reproduced in step S174, described later, and at least a predetermined amount of data has accumulated in the buffer.

The process in step S172 is performed by the central controller 250, the data encoder 230, the laser waveform controller 240, and the optical pickup PU.

Next, when a recording stop command is issued by a means not shown in the drawings (step S173), data recording onto the optical disc 160 ends (S199).

The process in step S173 is performed by the central controller 250 and a means (interface, not shown) that receives the recording stop command.

In step S173, if the recording stop command has not been issued, the process proceeds to step S174 and the signal recorded in step S172 is reproduced.

The process in step S174 is performed by the central controller 250, the optical pickup PU, the head amplifier 190, and the equalizer 220.

Next, in step S175, the jitter detector 280 detects the jitter value JA of the signal reproduced in step S174.

Then, in step S176, it is determined whether the jitter value JA detected in step S175 satisfies the condition of being within the jitter tolerance prestored in the ROM 250b.

If this condition is satisfied, after the process in step S187, described later, the recording area is changed in step S188, and then recording is performed onto the new recording area of the optical disc 160 in step S172; if this condition is not satisfied, a parameter adjustment in accordance with a specific write strategy is performed in steps S177 to S186, as described later.

If the jitter tolerance stored in the ROM 250b is the range up to but not including 10%, for example, then if the jitter value detected in step S175 is 9%, the recording area is changed in step S188 and then recording onto the optical disc 160 is performed again in step S172; if the jitter value detected in step S175 is 10%, a specific parameter of the write strategy is adjusted in steps S177 to S186, as described later.

Next, in step S177, one of the parameters of the write strategy (e.g., parameter Ttop, dTtop, TMP, or dTE of the write strategy in FIG. 2(c)) is selected according to its rank k. The ranks k assigned to the parameters of the write strategy in order of their effect on the jitter value are prestored in the ROM 250b.

Among the parameters shown in FIG. 2(c), in general, the width Ttop of the leading pulse F and the width TMP of the intermediate pulse M have a comparatively large effect on the jitter value, while the shift dTtop in the starting position of the leading pulse and the shift dTE in the starting position of the erasing pulse have a comparatively small effect on the jitter value.

The first time after the start of data recording in step S170, the parameter with rank k equal to one, that is, the parameter with the smallest effect on the jitter, is selected in step S177.

The write strategy parameter selected in step S177 is adjusted in steps S179 to S186.

The reason why the write strategy parameter having the smallest effect on the jitter value is selected here is that if a write strategy parameter having a large effect on the jitter value, e.g., the width Ttop of the leading pulse F or the width TMP of the intermediate pulse M shown in FIG. 2(c), were to be selected, and if the selected write strategy parameter were to be adjusted in the wrong direction, the jitter value would become considerably worse than before the adjustment, adversely affecting recording onto the optical disc 160 in FIG. 1. If a write strategy parameter having a small effect on the jitter value, e.g., the shift in the starting position of the leading pulse dTtop or the shift in the starting position of the erasing pulse dTE shown in FIG. 2(c), is selected instead, then even if the selected write strategy parameter is adjusted in the wrong direction, the adverse effect on the jitter value, as compared with the value before the adjustment, is small.

In step S178, the jitter value JA detected in step S175 is compared with the jitter value JB initially set in step S171 or the jitter value detected in the immediately preceding recording process (the jitter value detected as the jitter value JA in the preceding execution of step S175).

If jitter value JA is smaller than jitter value JB, the write strategy parameter selected in step S177 is adjusted in the same direction as in the immediately preceding recording process (S179). This is because the adjustment direction of the write strategy parameter selected in step S177 in the immediately preceding recording process was a direction that improved the jitter value. In the first adjustment (the adjustment based on the result of the reproducing process in step S174 of the data first recorded in step S172 after the start of the recording of data in step S170), because the JB value is the maximum expressible value (as initialized in step S171), JA is inevitably smaller than JB. The reason such processing is performed will be described later.

In a later adjustment, however, if the jitter value JA is larger than the jitter value JB, the write strategy parameter selected in step S177 is adjusted in step S180 in the direction opposite to the adjustment direction in the immediately preceding recording process. This is because the adjustment direction of the parameter selected in step S177 in the immediately preceding recording process was not a direction that improved the jitter value. Next, in step S181, the value of m is incremented by one.

The number of times m that the jitter value was worse than the immediately preceding time is thereby updated.

In the first write strategy parameter adjustment, the adjustment of the parameter in steps S179 and S180 may be performed in either the positive or negative direction. The direction may be initially set in step S171, for example, or may be decided based on the adjustment direction in the preceding recording process (the last direction set for the same parameter when the processing in step S180 and the following steps was performed).

In the latter case, when the parameter having the smallest effect on the jitter value is selected in step S177, the selected parameter is adjusted in steps S179 to S186, and in the next recording process (the process following recording in step S172 after step S188), if it is determined that the jitter value is in tolerance in step S176, the adjustment direction of the parameter having the smallest effect on the jitter value is set with reference to the preceding recording process (set to the same direction).

Next, in step S182, the jitter value JB is updated to the jitter value JA detected in step S175, which is the jitter value in the immediately preceding recording process.

Then, in step S183, if the value of m is one or less, the write strategy parameter selected in step S177 is changed by one step in step S184.

If the value of m is greater than one in step S183, that is, if the value of m is two, then in step S185 the adjustment direction of the write strategy parameter selected in step S177 is changed and the parameter is adjusted by one step.

This is because if the value of m is two, the adjustment direction of the write strategy parameter selected in step S177 has been changed twice (in step S180) and even if the write strategy parameter is changed further, the jitter value will not be improved. In this case, the selected write strategy parameter is optimized by changing the adjustment direction and adjusting the selected write strategy parameter by one step in step S185. Then, in step S186, the value of m is cleared to zero and the value of k is incremented. This causes the write strategy parameter having the next smallest effect on the jitter value after the write strategy parameter selected in the immediately preceding recording process to be selected in step S177; this write strategy parameter will be adjusted in the next recording process.

The reason why the unlimitedly large JB is used in the first adjustment of the write strategy parameter here is that if a small JB value were used and the value of JB turned out to be smaller than JA in step S178, m would become one in step S181 before the first adjustment of the write strategy parameter had been performed, so the write strategy parameter selected in step S177 could be adjusted in only one direction, and the procedure might proceed to the next process without adjusting the selected write strategy parameter to the optimal value.

When the jitter value is within tolerance in step S176, m and k are initialized in step S187: the value of m to zero, the value of k to one. Since the value of k is initialized to one, if the jitter value is determined to be out of tolerance in step S176 in the next recording process, the write strategy parameter having the smallest effect on the jitter value is reselected in step S177.

When the jitter value is within tolerance in step S176 and the value of k is not one, if the optimal values of all the parameters with ranks less than k do not change responsive to a change in the rank-k parameter, that is, if adjustment of the rank-k parameter has no effect on the optimal values of all the parameters with ranks less than k, then the value of k when the jitter value is determined to be within tolerance in step S176 may be left unchanged, instead of being initialized to one in step S187.

This enables more rapid adjustment of the write strategy parameters if the jitter value is out of tolerance in step S176 in the next and later recording processes.

In step S188, the recording area onto which data are recorded on the optical disc 160 is changed.

The process in steps S176 to S188 is performed by the central controller 250.

FIG. 5 illustrates the method of determining the rank k assigned to each of the write strategy parameters, based on their effects on the jitter value J.

As an example, of the write strategy parameters in FIG. 2(c), the width (denoted 3Ttop below) of the leading pulse F of the 3T mark signal will be used. One step on the horizontal axis indicates the minimum increment (the minimum amount) by which the laser waveform controller 240 can change the width: the minimum increment is, for example, T/40 or 0.025T. The rank of the effect of a write strategy parameter on the jitter value is determined from the average value of the change in the jitter value J measured at each step in the range of ±3 steps, as indicated in the drawing. In this drawing, the average value of the changes in the six jitter values J is 2.29%. Although only 3Ttop is taken as an example, the ranks of the effects of the other write strategy parameters (dTtop, TMP, dTE) on the jitter value are also determined by calculating the average value of the change in the jitter value J. Alternatively, the rank may be determined from, for example, the maximum change (in this case, 5.31%) of the six jitter values J in the drawing.

The above effects of the write strategy parameters on the jitter value are measured with an optical disc device identical to the optical disc device in FIG. 1 in, for example, the development stage of the optical disc device, ranks are assigned on the basis of the measurement results, and the ranks are prestored in the ROM 250b of each optical disc device in the manufacturing stage (before shipment).

In the above example, when the processing in step S177 is first performed after the start of data recording (step S170) in the procedure in FIG. 4, the parameter with rank k equal to one was selected, but the parameter ranked highest in its effect on the jitter value may be selected from among the parameters with effects on the jitter value that are equal to or less than a prescribed threshold value. The write strategy parameters can be adjusted efficiently in this way.

In this case, since the effect of a write strategy parameter on the jitter value differs depending on the type of optical disc 160 in FIG. 1, the effect is not stored in the ROM 250b in the central controller 250; instead, after the strategy is optimized in the trial writing in step S16 in FIG. 3, the average or maximum value of the change in the jitter value is obtained, also by trial writing, and then the effect is stored, for example, in the RAM 250c in the central controller 250, as an index value.

As described above, when the jitter value of a reproduced signal obtained from recorded data exceeds a threshold value that can be arbitrarily set, write strategy parameters are selected in ascending order, from the parameter with the small effect on the jitter value, and adjusted, based on the jitter value, whereby stable recording can be performed constantly without substantial jitter degradation.

Second Embodiment

In the first embodiment above, the adjustment direction of the selected write strategy parameter is determined in steps S179 and S180 in FIG. 4, based on the jitter value of a reproduced signal obtained from data recorded on the optical disc 160 shown in FIG. 1, but instead, the adjustment direction of the selected write strategy parameter may be determined from the waveform of the reproduced signal obtained from the recorded data.

Figure 2:
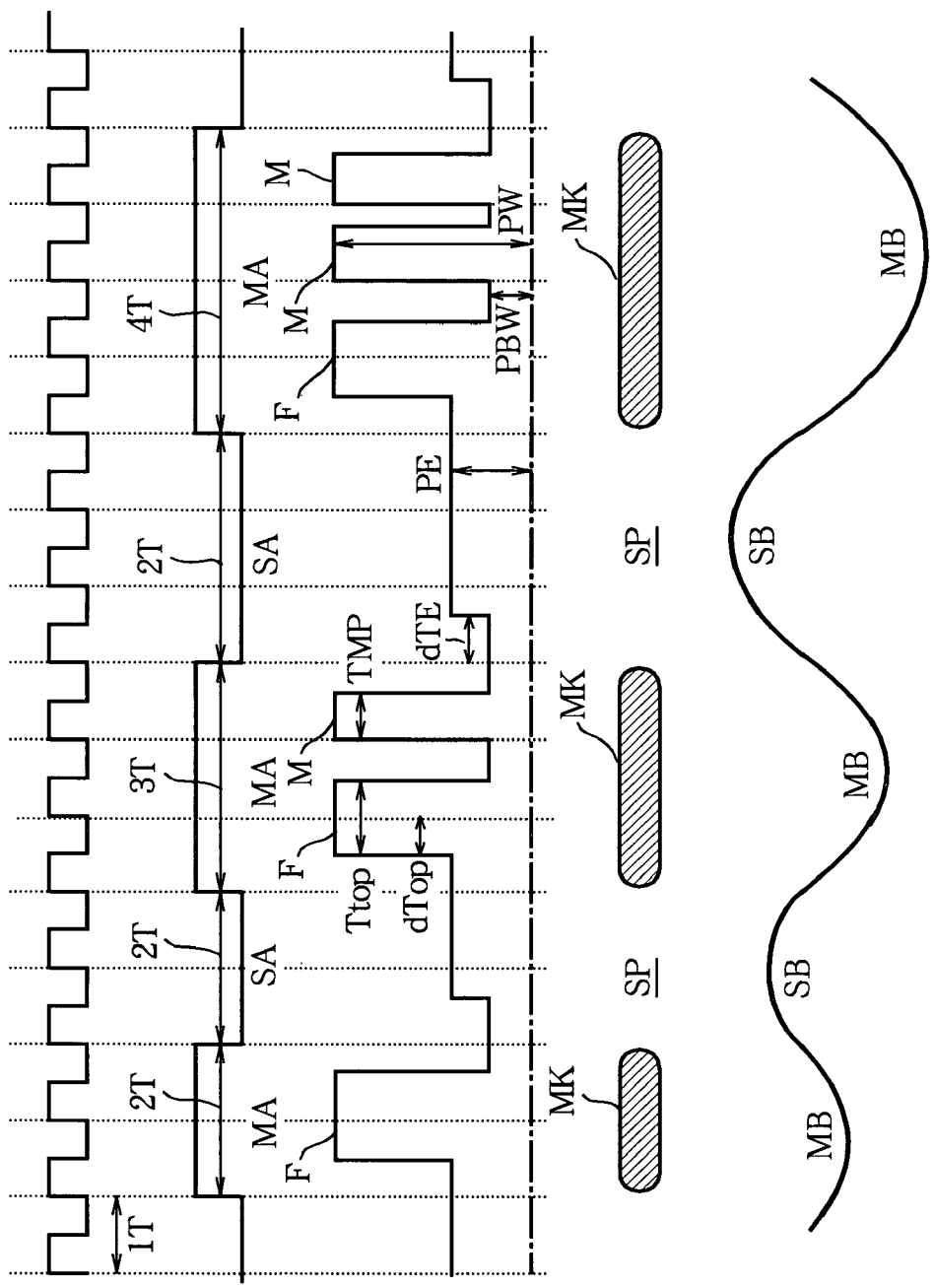
FIGS. 2(a) to 2(e) illustrate an exemplary write strategy generated in the optical recording and reproducing devices in the first and second embodiments of the invention in recording on an optical disc.

The drawings referred to in the second embodiment will now be described. FIGS. 2(*a*) to 2(*e*) and FIG. 3 will also be referred to in the description of the second embodiment.

Figure 6:
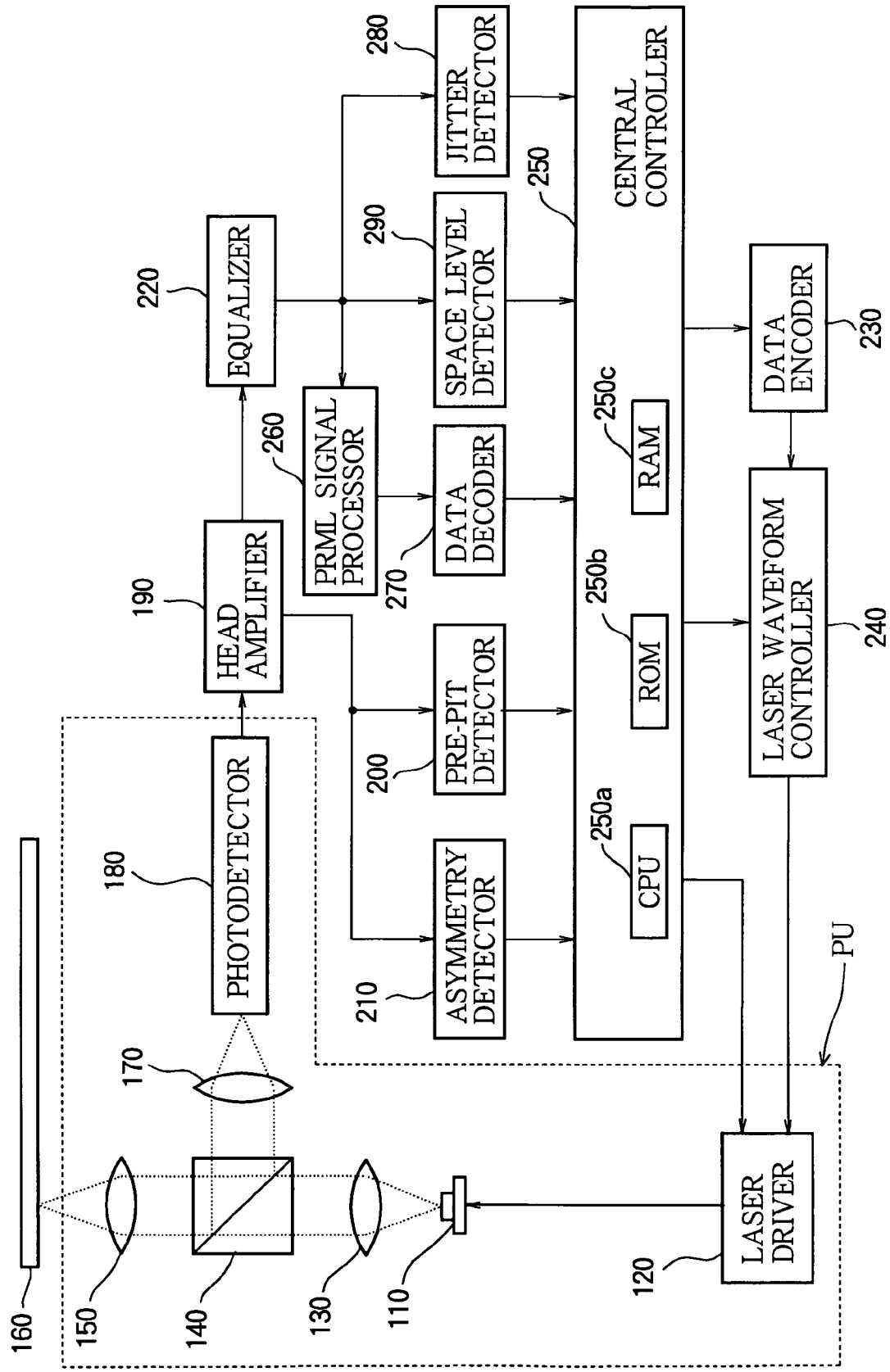
FIG. 6 shows the structure of an exemplary optical recording and reproducing device in the second embodiment of the invention.
Figure 7:
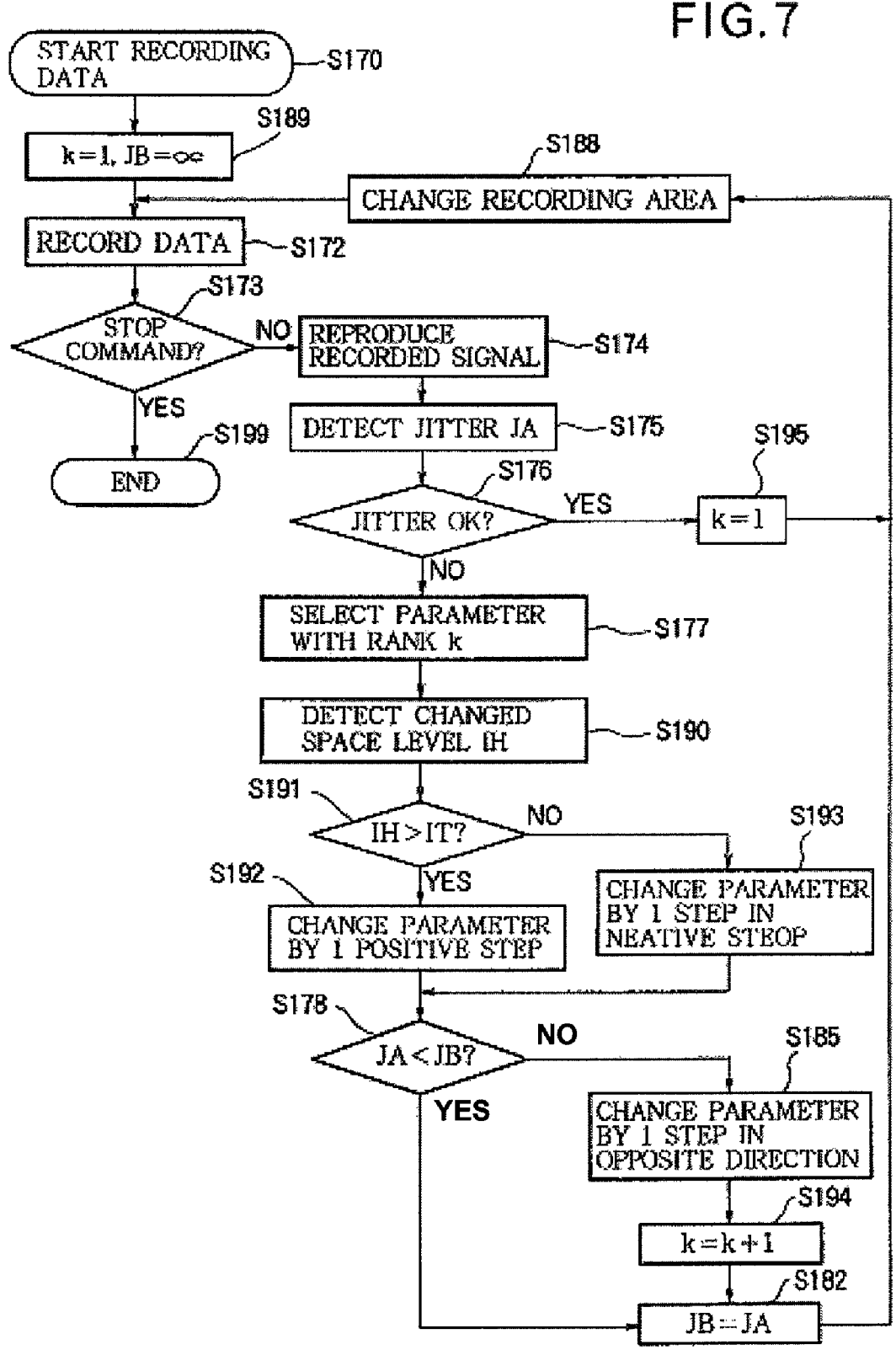
FIG. 7 is a flowchart illustrating an exemplary data recording procedure in the optical recording and reproducing method in the second embodiment.
Figure 9:
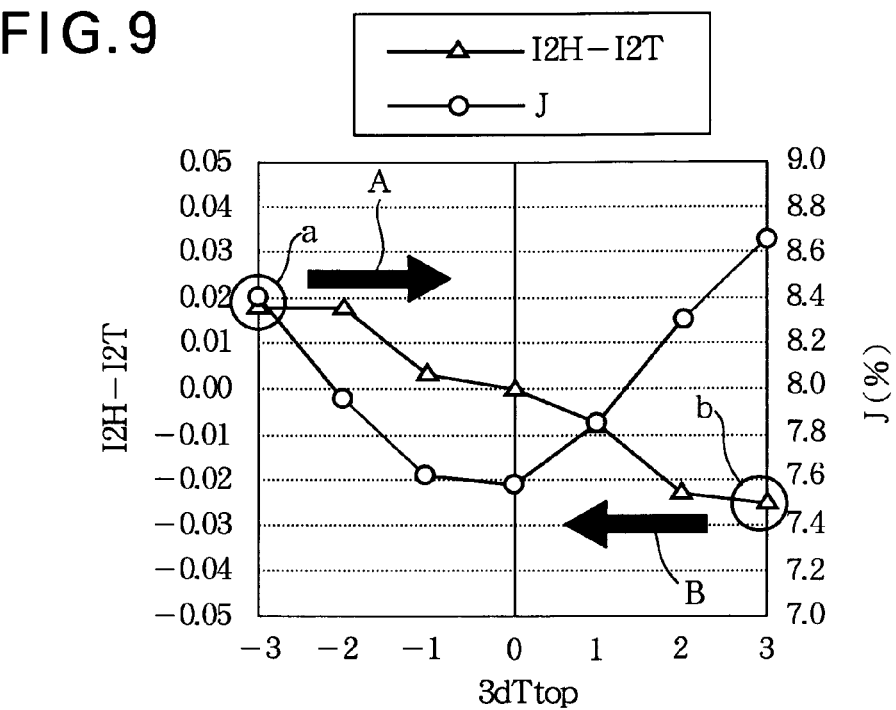
FIG. 9 shows the relationship between the shift in the starting position 3dTtop of the leading pulse of a mark of length 3T and the difference between the actual and target levels of a 2T space followed by a mark of length 3T in the reproduced signal, and the relationship between 3dTtop and the jitter value, in the optical recording and reproducing device in the second embodiment of the invention.
Figure 10:
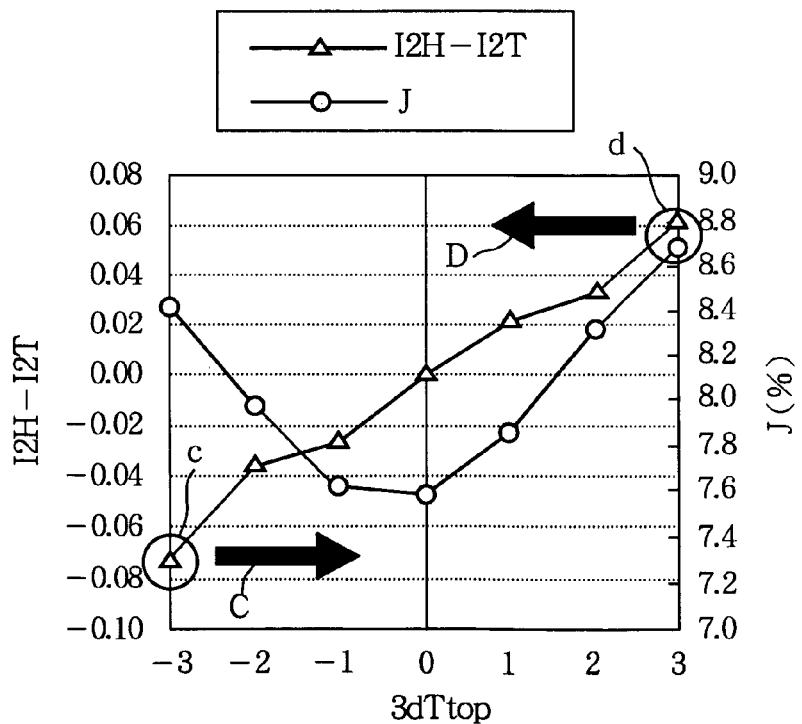
FIG. 10 shows the relationship between the shift in the starting position 3dTtop of the leading pulse of a mark of length 3T and the difference between the actual and target levels of a 2T space level preceded by a mark of length 3T in the reproduced signal, and the relationship between 3dTtop and the jitter value, in the optical recording and reproducing device in the second embodiment of the invention.

FIG. 6 is a drawing showing an example of the basic structure of the optical recording and reproducing apparatus. FIG. 7 is a flowchart showing an exemplary data recording procedure in the optical recording and reproducing method carried out using the optical recording and reproducing device in FIG. 6. FIGS. 8(*a*) to 8(*e*) are drawings showing the space level for a 2T space in the reproduced signal detected by the space level detector 290 when the following mark length is 3T. FIG. 9 is a drawing showing the relationship between the shift in the starting position 3dTtop of the leading pulse of a mark of length 3T and the difference between the actual and target levels of a 2T space followed by a mark of length 3T, and the relationship between 3dTtop and the jitter value, in the optical recording and reproducing device in FIG. 6. FIG. 10 shows the relationship between the shift in the starting position 3dTtop of the leading pulse of a mark of length 3T and the difference between the actual and target levels of a 2T space level preceded by a mark of length 3T, and the relationship between 3dTtop and the jitter value, in the optical recording and reproducing device in FIG. 6.

Reference characters in FIG. 6 that are the same as in FIG. 1 indicate the same or similar elements.

The optical recording and reproducing device in FIG. 6 is generally the same as the optical recording and reproducing device in FIG. 1, but a space level detector 290 has been added. The space level detector 290 detects the peak level of the parts corresponding to spaces in the electrical signal that has been reshaped by the equalizer 220, that is, in the reproduced signal. In this case, the peak level of spaces consisting of each number of clock periods is detected separately according to the length of the preceding or following mark (the mark length expressed in clock periods).

Besides storing jitter value tolerances, ranks of the effect of write strategy parameters on the jitter value, and various other such data as in the first embodiment, the ROM 250b also stores target values of space level values detected by the space level detector 290.

The procedure from the insertion of an optical disc through recording in the second embodiment is similar to the procedure described with reference to FIG. 3 in the first embodiment, except that the processing in step S17 differs. FIG. 7 details the processing in step S17 in the second embodiment.

The processing in steps S172 to S178, S185, and S188 is the same as the processing shown in FIG. 4, so descriptions will be omitted.

In step S189 in FIG. 7, k is set to one and JB is set to an unlimitedly large value (the maximum expressible value), but the process of setting m to zero in step S171 in FIG. 4 is not performed.

This is because, unlike the processing procedure in FIG. 4, as described below, when the jitter value obtained by reproducing the recorded signal is out of tolerance, it is not necessary to use m to indicate the number of times when the jitter value worsens compared with the jitter value obtained the in the immediately preceding time. This situation is the same in steps S194 and S195 (which correspond, respectively, to steps S186 and S187 in FIG. 4).

The processing in step S189 is performed by the central controller 250.

In step S190, the space level detector 290 in FIG. 6 detects the space level value IH, which varies with the write strategy parameter selected in step S177. This space level value IH which varies with the selected write strategy parameter is the level value of the reproduced signal obtained from a space preceding or following a mark recorded by using the selected write strategy parameter, as will be described later with reference to FIGS. 8(*a*) to 8(*e*).

In step S191, the space level IH detected in step S190 is compared with the space level target value IT prestored in the ROM 250b. If the space level IH detected in step S190 is larger than the target value IT, the write strategy parameter selected in step S177 is changed by one step in the positive direction in step S192. If the space level IH detected in step S190 is smaller than the target value IT, the write strategy parameter selected in step S177 is changed by one step in the negative direction in step S193. In this way, while the write strategy parameters in the first embodiment were adjusted according to the jitter value, the write strategy parameters in the second embodiment are adjusted according to the space level value detected by the space level detector.

In step S178, the jitter value JA detected in step S175 is compared with the jitter value initially set in step S189 or the jitter value JB in the immediately preceding recording process (the jitter value detected as the jitter value JA in the processing in step S175 the previous time).

If JA is smaller than JB, the value of JB is set equal to the value of JA in step S182 and the process returns to step S188. This causes the write strategy parameter selected in step S177 to be adjusted in the next recording process.

If JA is larger than JB, the adjustment direction of the parameter selected is changed (reversed) and the value of the parameter is changed by one step in step S185, the value of k is incremented in step S194, and the process proceeds to step S182. It is thereby concluded that the write strategy parameter selected in step S177 has been optimally adjusted, so the write strategy parameter with the next smallest effect on the jitter value is selected and will be adjusted.

If the jitter value is within tolerance in step S176, k is initialized in step S195. That is, the value of k is set to one. Since the value of k is set to one, if it is determined that the jitter value is out of tolerance in step S176 in the next recording process, the write strategy parameter with the smallest effect on the jitter value will be selected again in step S177.

The processing in steps S191 to S195 is performed by the central controller 250.

FIGS. 8(*a*) to 8(*e*) show an exemplary combination of a 2T space and an immediately following 3T mark in a signal obtained by reproducing a signal recorded on the optical disc 160 in the optical recording and reproducing apparatus 100 shown in FIG. 6. The example shows change in the shape of the reproduced waveform when the shift (denoted 3dTtop below) in the starting position of the leading pulse of the 3T recording mark length shown in FIG. 2(c) is positive and negative with respect to the optimal point.

FIG. 8(a) shows data to be recorded, comprising a mark MA and a space SA. FIGS. 8(b) to 8(d) show write strategies for recording the data to be recorded in FIG. 8(a). FIG. 8(b) shows a case in which the shift in the starting position of the leading pulse 3dTtop has the optimal value 3dTtop(1); FIG. 8(c) shows a case in which 3dTtop is shifted in the negative direction from 3dTtop(1); FIG. 8(d) shows a case in which 3dTtop is shifted in the positive direction from 3dTtop(1).

FIG. 8(e) shows reproduced signals obtained by reading marks, and the spaces between the marks, formed on the optical disc as shown in FIG. 6 by performing recording according to the write strategies in FIGS. 8(b) to 8(d).

When 3dTtop has the optimal value 3dTtop(1) shown in FIG. 8(b), the space signal SB (the portion of the reproduced signal corresponding to the space) is represented by curve RD3(1) in FIG. 8(e).

When data are recorded with 3dTtop(2), shifted in the negative direction with respect to 3dTtop(1) as shown in FIG. 8(c), the following mark portion MB of the reproduced signal is shifted back from its position when recorded with 3dTtop (1), and the amplitude I2H of the preceding 2T space signal SB increases due to the effect of inter-symbol interference, as shown by curve RD3(2).

By contrast, when data are recorded with 3dTtop(3), shifted in the positive direction with respect to 3dTtop(1) as shown in FIG. 8(d), the following mark portion MB of the reproduced signal is shifted forward from its position when recorded with 3dTtop(1), and the amplitude I2H of the preceding 2T space signal SB decreases due to the effect of inter-symbol interference, as shown by curve RD3(3).

If the peak value of the space level of curve RD3(1) is denoted I2H(1), the peak value of the space level of curve RD3(2) is denoted I2H(2), and the peak value of the space level of curve RD3(3) is denoted I2H(3), then I2H(3) is smaller than I2H(1) and I2H(1) is less than I2H(2). Since 3dTtop is the optimal value when the peak value of the space level is I2H(1), if the peak value of the space level is larger than I2H(1), 3dTtop should be shifted in the positive direction; if the peak value of the space level is smaller than I2H(1), 3dTtop should be shifted in the negative direction. The target value I2T of the space level prestored in the ROM 250b is I2H(1).

FIG. 9 shows the relationship between the above 3dTtop and the difference between the above space level value I2H and the target value I2T (I2H−I2T), and the relationship between the above 3dTtop and the jitter value J. Here, one step on the horizontal axis is the minimum change that can be produced by the laser waveform controller 240: this minimum change is, for example, T/40=0.025T. The value of I2T is 0.466. From this graph, when 3dTtop is first adjusted, it is impossible to decide whether 3dTtop should be adjusted in the positive or negative direction by referring only to the jitter value, but it is possible to decide whether 3dTtop should be adjusted in the positive or negative direction if 3dTtop is adjusted according to the value of I2H−I2T. That is, when I2H−I2T has a positive value as at point a, 3dTtop should be adjusted in the positive direction as indicated by arrow A, and when I2H−I2T has a negative value as at point b, 3dTtop should be adjusted in the negative direction as indicated by arrow B.

Here, 3dTtop is adjusted according to the level value of a 2T space followed by a 3T mark, but 3dTtop can also be adjusted according to the level value of a 2T space preceded by a 3T mark. FIG. 10 shows the relationship between 3dTtop and the difference between the space level value I2H and the target value I2T, and the relationship between 3dTtop and the jitter value. The value of I2T in this case is 0.48. From this graph, when I2H−I2T has a negative value as at point c, 3dTtop should be adjusted in the positive direction as indicated by arrow C, and when I2H−I2T has a positive value as at point d, 3dTtop should be adjusted in the negative direction as indicated by arrow D. This is opposite to the adjustment directions in FIG. 9; in step S192 in FIG. 7, the process is altered to change the selected parameter by one step in the negative direction, and in step S193, the process is altered to change the selected parameter by one step in the positive direction.

The types of space level values used in the adjustment of 3dTtop have been described above, but in general, to adjust a write strategy parameter in FIG. 2(c) for an nT mark signal, the shift dTtop of the starting position and the width Ttop of the leading pulse may be adjusted based on the level value of a 2T space if it is followed by an nT mark or a 2T space if it is preceded by an nT mark. The intermediate pulse width TMP and the shift dTE in the starting position of the erasing pulse should be adjusted based on the level value of a 2T space following an nT mark.

The target value of the space level detected in step S190 in FIG. 7 may be obtained by trial writing after the optimization of the strategy by the trial writing in step S16 in FIG. 3, instead of being prestored in the ROM 250b.

As described above, in this embodiment, by adjusting write strategy parameters having small effects on the jitter value according to the value of the space level of the reproduced signal obtained from the recorded data, the adjustment direction of the write strategy parameters can be recognized.

Although the first and second embodiments dealt with the 2T to 9T mark signals recorded in (1-7) modulation, even in EFM-plus (8-16) modulation, which records 3T to 11T and 14T mark signals and is used in DVDs etc., if the relationship between the write strategy parameters and the jitter value and the relationship between changes in the write strategy parameters and the space level value are known, the same write strategy parameter adjustment method as in the first and second embodiments can be used.

Those skilled in the art will recognize that further variations are possible within the scope of the invention, which is defined in the appended claims.

What is claimed is:

1. An optical recording method for recording data by directing laser light onto an optical recording medium according to a plurality of kinds of parameters of a write strategy based on a length of the data, the optical recording method comprising:
   detecting, during recording of data in a data area after optimizing the write strategy through trial writing, a jitter value of a signal reproduced from recorded data and deciding whether the jitter value exceeds a prescribed threshold value;
   adjusting, at the time of recording, one of the plurality of kinds of parameters, among the parameters related to pulse widths and shift in pulse positions of the write strategy, until the jitter value becomes not larger than the prescribed threshold value, wherein adjusting a kind of parameter comprises selecting the plurality of kinds of parameters in ascending order of effect on the jitter value and adjusting each selected kind of parameter; and
   performing recording again, using the adjusted kind of parameter.

2. The optical recording method of claim 1, wherein the adjusted kind of parameter is a kind of parameter having minimum effect on the jitter value among the plurality of kinds of parameters of the write strategy.

3. The optical recording method of claim 2, wherein adjusting a kind of parameter comprises:
   determining a kind of parameter to be adjusted; and
   deciding an adjustment direction of the kind of parameter.

4. The optical recording method of claim 3, wherein determining a kind of parameter comprises determining said kind of parameter conditional on a predetermined rank of effect on the jitter value.

5. The optical recording method of claim 3, wherein determining a kind of parameter comprises determining said kind of parameter conditional on a rank of effect on the jitter value, the rank being determined from an amount of change in the jitter value per a minimum change in each kind of parameter of the write strategy.

6. The optical recording method of claim 3, wherein deciding the adjustment direction comprises comparing the jitter value of the signal reproduced from the recorded data with the jitter value of a signal reproduced from data recorded immediately previously.

7. The optical recording method of claim 3, wherein deciding the adjustment direction comprises deciding the adjustment direction from a space level value of the signal reproduced from the recorded data.

8. The optical recording method of claim 7, wherein the space level value is the level value of the signal reproduced from a space preceding or following a mark recorded using the kind of parameter to be adjusted.

9. The optical recording method of claim 1, wherein the adjusted kind of parameter is a kind of parameter having maximum effect on the jitter value, among a plurality of kinds of parameters that change the jitter value by an amount equal to or less than a prescribed value per minimum parameter change.

10. The optical recording method of claim 1, wherein adjusting a kind of parameter comprises determining a kind of parameter to be adjusted conditional on the rank of effect on the jitter value.

11. The optical recording method of claim 1, wherein the effect of each kind of parameter on the jitter value corresponds to an amount of change in the jitter value per a minimum change in said each kind of parameter of the write strategy.

12. An optical recording device for recording data by directing laser light onto an optical recording medium according to a plurality of kinds of parameters of a write strategy based on a length of the data, the optical recording device comprising:
   a decision section for detecting, during recording of data in a data area after optimizing the write strategy through trial writing, a jitter value of a signal reproduced from recorded data and deciding wither the jitter value exceeds a prescribed threshold value;
   a parameter adjustment section for adjusting, during the recording of data, one of the plurality of kinds of parameters, among the parameters related to pulse widths and shift in pulse positions of the write strategy, until the jitter value becomes not larger than the prescribed threshold value, wherein the parameter adjustment section selects the plurality of kinds of parameters in ascending order of effect on the jitter value and adjusts each selected kind of parameter; and
   a section for recording data, using the adjusted kind of parameter.

13. The optical recording device of claim 12, wherein the adjusted kind of parameter is a kind of parameter having minimum effect on the jitter value among the plurality of kinds of parameters of the write strategy.

14. The optical recording device of claim 13, wherein the parameter adjustment section comprises:
   a parameter selection subsection for determining a kind of parameter to be adjusted; and
   a direction selection subsection for deciding an adjustment direction of the kind of parameter.

15. The optical recording device of claim 14, wherein the parameter selection subsection determines said kind of parameter conditional on a predetermined rank of effect on the jitter value.

16. The optical recording device of claim 14, wherein the parameter selection subsection determines said kind of parameter conditional on a rank of effect on the jitter value, the rank being determined from an amount of change in the jitter value per a minimum change in each kind of parameter of the write strategy.

17. The optical recording device of claim 14, wherein the direction selection subsection decides the adjustment direction by comparing the jitter value of the signal reproduced from the recorded data with the jitter value of a signal reproduced from data recorded immediately previously.

18. The optical recording device of claim 14, wherein the direction selection subsection decides the adjustment direction from a space level value of the signal reproduced from the recorded data.

19. The optical recording device of claim 18, wherein the space level value is the level value of the signal reproduced from a space preceding or following a mark recorded using the kind of parameter to be adjusted.

20. The optical recording device of claim 12, wherein the adjusted kind of parameter is a kind of parameter having maximum effect on the jitter value, among a plurality of kinds of parameters that change the jitter value by an amount equal to or less than a prescribed value per minimum parameter change.

21. The optical recording device of claim 12, wherein the parameter adjusting section determines a kind of parameter to be adjusted conditional on the rank of effect on the jitter value.

22. The optical recording device of claim 12, wherein the effect of each kind of parameter on the jitter value corresponds to an amount of change in the jitter value per a minimum change in said each kind of parameter of the write strategy.

* * * * *